US010974834B2

(12) United States Patent
Gharia et al.

(10) Patent No.: US 10,974,834 B2
(45) Date of Patent: Apr. 13, 2021

(54) SEPARABLE VEHICLE CABIN PRIVACY PARTITION ASSEMBLIES WHICH ALLOW FOR EMERGENCY EGRESS

(71) Applicant: EMBRAER S.A., São José dos Campos-SP (BR)

(72) Inventors: Beenal Gharia, Melbourne, FL (US); Brian Rahn, Melbourne, FL (US); Janyce Wynter, Melbourne, FL (US); Jay Beever, Melbourne, FL (US); Joshua Rea, Melbourne, FL (US); Paulo Celso Pires, Melbourne, FL (US)

(73) Assignee: EMBRAER S.A., São José Dos Campos—SP (BR)

( * ) Notice: Subject to any disclaimer, the term of this patent is extended or adjusted under 35 U.S.C. 154(b) by 427 days.

(21) Appl. No.: 15/926,135

(22) Filed: Mar. 20, 2018

(65) Prior Publication Data
US 2018/0297707 A1    Oct. 18, 2018

Related U.S. Application Data

(60) Provisional application No. 62/484,991, filed on Apr. 13, 2017.

(51) Int. Cl.
*B64D 11/00* (2006.01)
*B64C 1/10* (2006.01)
*B64D 11/02* (2006.01)

(52) U.S. Cl.
CPC ............ *B64D 11/0023* (2013.01); *B64C 1/10* (2013.01); *B64D 11/02* (2013.01)

(58) Field of Classification Search
CPC ..... B64D 11/0023; B64C 1/10; B64C 1/1469; E06B 1/003; E06B 1/006
See application file for complete search history.

(56) References Cited

U.S. PATENT DOCUMENTS

| 6,257,523 | B1 * | 7/2001 | Olliges | B61D 17/048 160/210 |
| 2014/0123571 | A1 * | 5/2014 | Swain | E06B 9/0638 52/79.1 |
| 2015/0107010 | A1 * | 4/2015 | Mogan | A47K 13/02 4/420 |
| 2016/0144944 | A1 * | 5/2016 | Goings | E05F 11/54 244/129.5 |
| 2018/0065751 | A1 | 3/2018 | Corrêa et al. | |

\* cited by examiner

*Primary Examiner* — Timothy D Collins
*Assistant Examiner* — Terri L Filosi
(74) *Attorney, Agent, or Firm* — Nixon & Vanderhye P.C.

(57) ABSTRACT

Separable partition assemblies provide privacy between adjoining aircraft cabin sections, e.g., between a main passenger cabin section and a section having an emergency exit and a belted toilet seat such as may be provided in executive aircraft. The separable partition assembly includes a bulkhead structure defining a bulkhead passageway opening to allow passenger egress from one vehicle cabin section to an adjoining vehicle cabin section that is provided with at least one panel sized and configured to close the bulkhead passageway. A nonpermanent mounting system mounts the panel to an inboard edge of the bulkhead structure to allow the at least one panel to be separably uncoupled from the bulkhead structure in response to exertion of a force of predetermined magnitude thereagainst to thereby allow unimpeded passenger egress between the adjoining vehicle cabin sections.

10 Claims, 11 Drawing Sheets

SEPARABLE VEHICLE CABIN PRIVACY PARTITION ASSEMBLIES WHICH ALLOW FOR EMERGENCY EGRESS

CROSS-REFERENCE TO RELATED APPLICATION

This application is based on and claims domestic priority benefits from U.S. Provisional Application Ser. No. 62/484,991 filed on Apr. 13, 2017, the entire contents of which are expressly incorporated hereinto by reference.

FIELD

The embodiments disclosed herein relate generally to interiors for transport vehicles, especially aircraft interior cabins. More specifically, the embodiments disclosed herein relate to partitions that may be usefully employed in aircraft interior cabins to provide privacy between different locations in the cabin yet allow for occupants to have unobstructed access to an emergency egress path.

BACKGROUND

Executive aircraft normally use a frangible solid pocket door for the lavatory compartment, to provide an acceptable level of privacy for the lavatory when occupied. It is also common to use a solid pocket door as cabin partitions to separate passenger compartments. However; the Federal Aviation Administration (FAA) has recently published a regulation (14 CFR § 25.813, Amendment 25-116, incorporated fully hereinto by reference) which prohibits the installation of doors between any passenger seat that is capable of being occupied for takeoff and landing and any passenger emergency exit. In an aircraft configuration where the emergency exit is located forward or aft of a belted toilet seat in the lavatory compartment, or located in a passenger compartment separated from another passenger compartment, the use of a door violates the FAA regulation.

Accordingly, the regulation has generated a demand to have a manually operated soft partition and privacy system featuring specific design aspects that will provide the required level of privacy (which a fabric curtain could not normally provide) while at the same time provide an overall level of safety equal to or higher than that intended by the FAA regulation (14 CFR § 25.813, Amendment 25-116). This development will in turn provide executive aircraft with the ability to have a safe lavatory privacy system and/or passenger cabin partitions that will allow the operation of their aircraft under private use (14 CFR Part 91), as well as "For Hire" operations (14 CFR Part 135). Having such an option will lift the limitation of operating only under private use (14 CFR Part 91), which in turn, broadens the resale market for any such aircraft.

It is therefore towards providing such a solution that the embodiments disclosed herein are directed.

SUMMARY

In general, cabin privacy partition in accordance with the embodiments disclosed herein includes at least one flexible solid panel, hinged along its vertical length, using soft material such as synthetic leather, which allows the panel to bi-fold to either side of the passageway between one section of the cabin (e.g., a lavatory) and another (e.g., main passenger cabin) during normal operation. The panel may also be hinged to a side-mount system that allows the panel to swing in both directions (e.g., move through at least 180 degrees), and includes a frangible coupling system (e.g., magnetic couplers, Velcro-brand hook and loop fabric fasteners or any other non-permanent coupling means) to attach to the bulkhead edge on either side of the passageway, thereby allowing the panels to potentially break away from the side except for the top corner where the partition assembly may be attached to the bulkhead using a lanyard.

The panel integrates a top closeout panel that conforms to the headliner curvature of the cabin so as to close out the top part of the passageway. In a fully deployed position, the inboard closeout panel is magnetically attached to a ball-joint assembly that glides along a curved track. The outboard closeout panel is magnetically aligned with the inboard closeout panel and is positioned vertically against a cam member that is part of the guide rail track.

In normal operation, the main partition panel will bi-fold, the inboard closeout panel will glide along the track and the outboard closeout panel will be actuated by the cam member. In an emergency operation, however, the closeout panels will disengage from the guide rail track and fully open to either side of the passageway upon application of a force exceeding a predetermined magnitude (e.g., a manual pushing force by a cabin occupant).

The bottom section of the partition panel incorporates an integrated living hinge formed of a suitable shape-retaining flexible material (e.g., a fabric, leather, vinyl or other flexible polymeric sheet material) that will allow the panel to bend freely when acted upon with certain amount of force, and together along with mechanical spring hinges placed along the vertical folds in the panel, then recover to its normal unbended shape when the force has been removed. The spring hinges will trigger the panel to fold back onto itself in both normal and emergency operation.

The construction of the privacy partition panel may incorporate sound dampening material that will minimize the transfer of sound between compartments when the privacy partition is closed. An occupancy indicator may be integrated in the handle of the partition panel so as to provide a visible indication whether the cabin compartment (e.g., the lavatory) is occupied.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
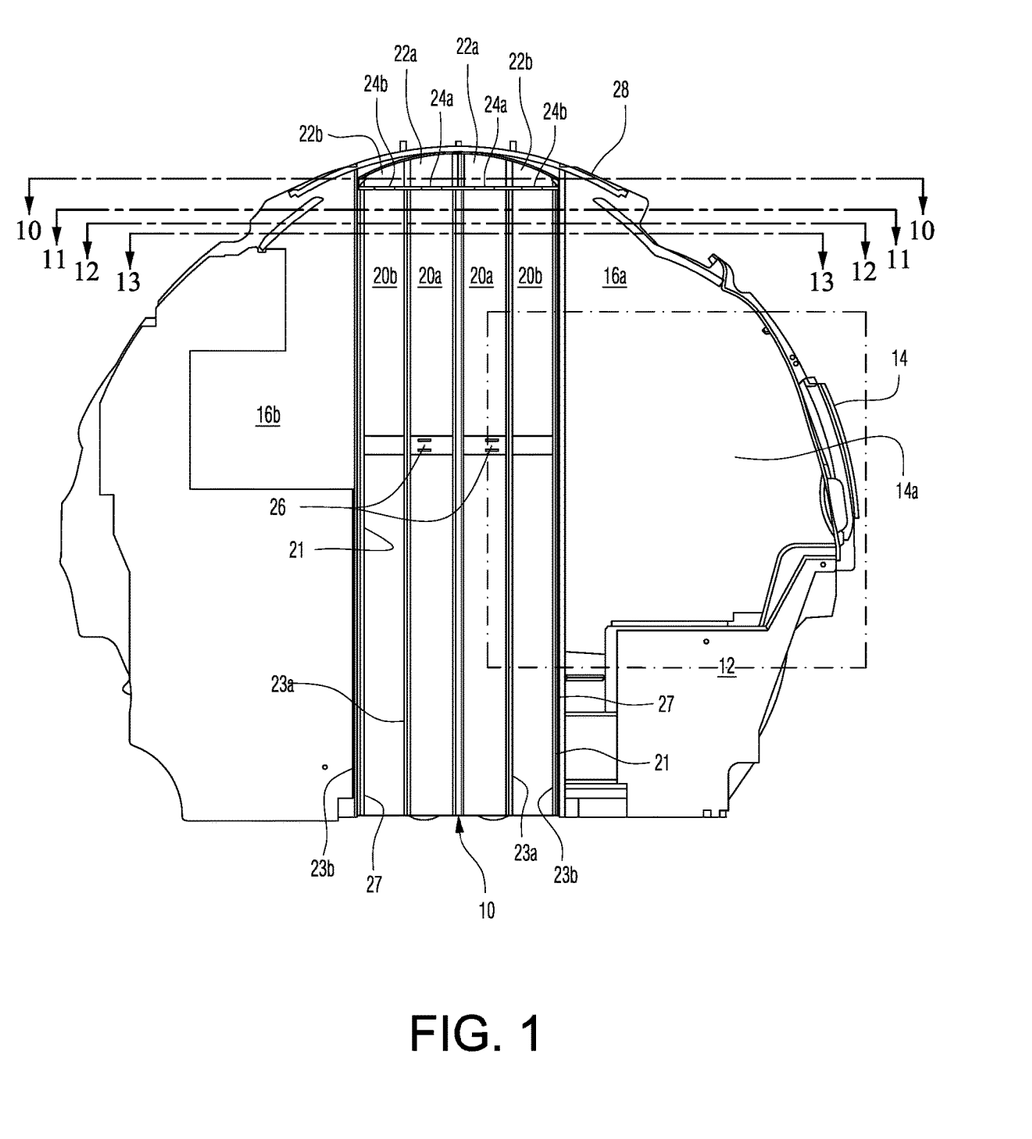
FIG. 1 is an elevational view of an aircraft bulkhead provided with a separable privacy partition in accordance with an embodiment of the present invention as viewed from the lavatory section of the interior cabin.
Figure 2:
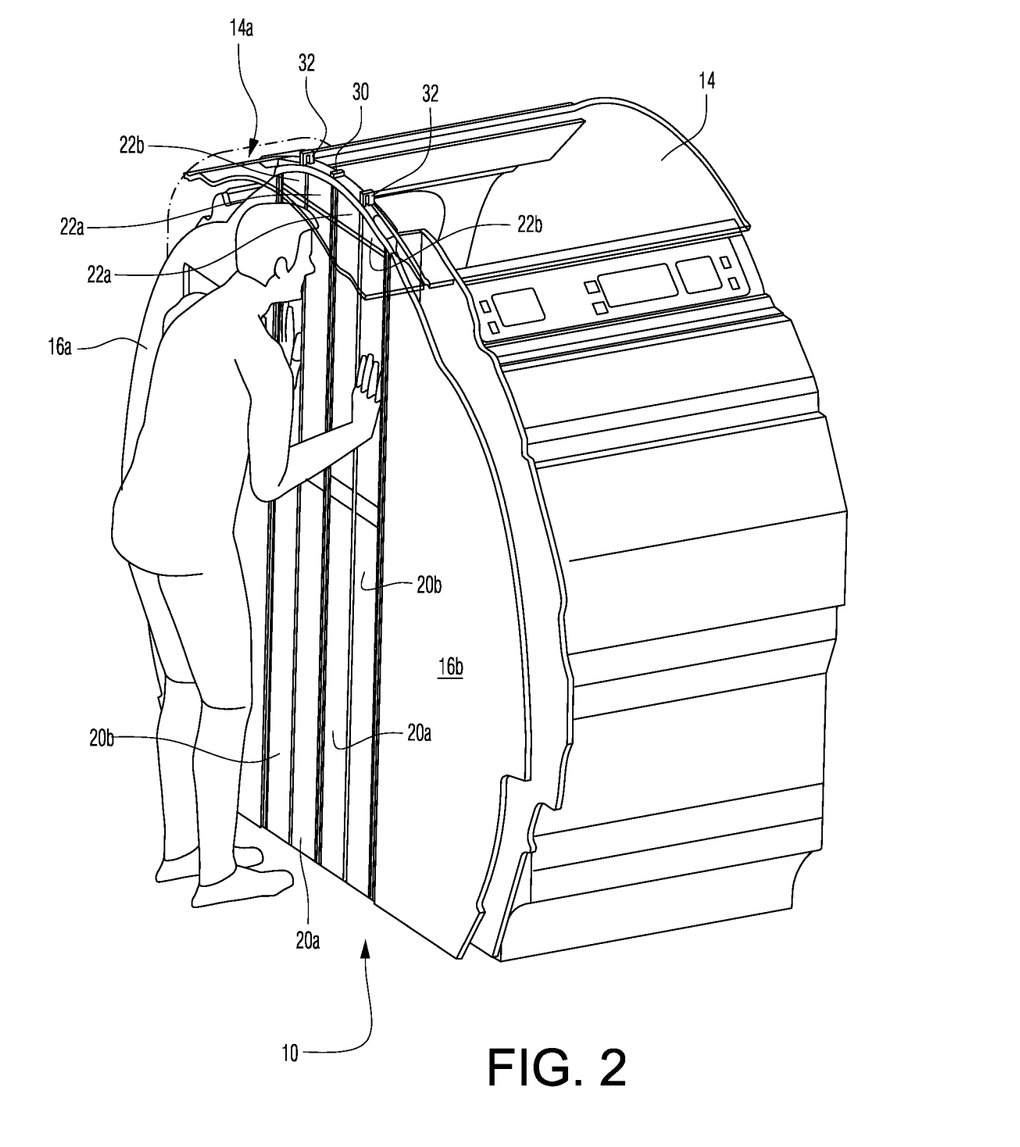
FIG. 2 is a perspective view of an aircraft interior cabin section as viewed from the main passenger cabin section showing the privacy partition in a fully closed position.

Accompanying FIGS. 1 and 2 depict an exemplary interior cabin privacy partition assembly 10 as viewed from a lavatory and main cabin side of the aircraft cabin, respectively. As depicted in FIG. 1, the lavatory section of the aircraft cabin for which the privacy partition assembly 10 is intended to provide privacy when occupied includes a belted toilet seat 12 such as that disclosed in U.S. Pat. No. 10,183,751 (the entire content of which is expressly incorporated hereinto by reference). An aircraft emergency exit 14 may be provided in the vicinity of the toilet 12 so as to establish an emergency egress path (shown by the region identified by reference numeral 14a) for occupants in all cabin sections in the event of an emergency evacuation.

In the embodiment depicted, the partition assembly 10 is positioned between opposed cabin bulkhead sections 16a, 16b so as to close the bulkhead passageway opening 16c (see e.g., FIG. 3) between the lavatory section of the aircraft cabin from another section of the aircraft cabin (e.g., the main passenger section). The partition assembly 10 includes opposed pairs of inboard and outboard main panels 20a, 20b that are substantially vertically planar and connected together longitudinally by a flexible hinge member 23a. The outboard edges of the outboard main partition panels 20b are in turn connected via flexible hinge member 23b directly to the partition 27 which abuts against the inboard edges 21 of each of the bulkhead partitions 16a and 16b. The flexible hinges 23a, 23b may be formed of any suitable flexible sheet material, e.g., via a living hinge formed of a suitable shape-retaining fabric that may be coated with an elastomeric material, natural or synthetic leather, vinyl or other flexible polymeric sheet material.

Figure 3:
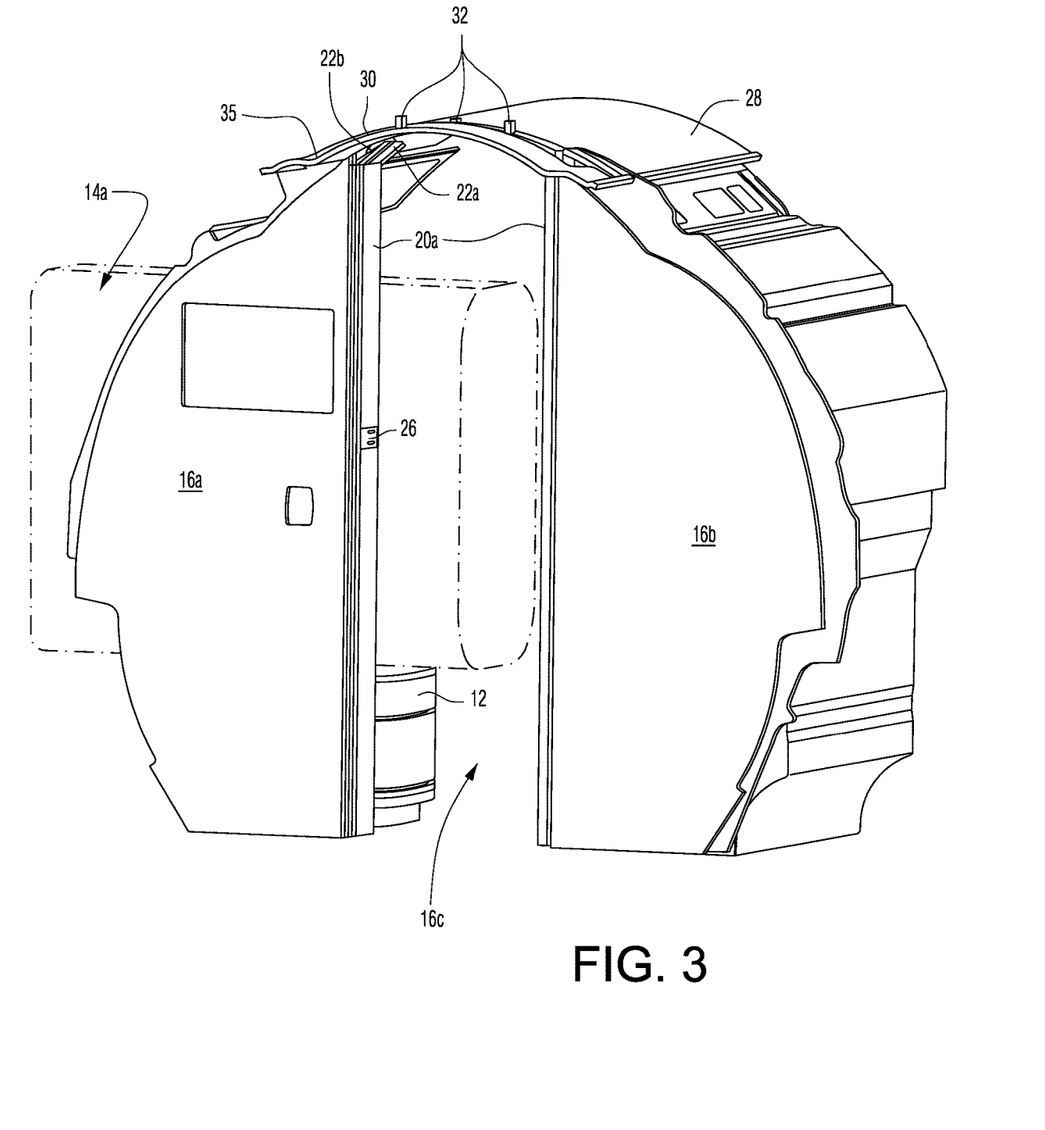
FIG. 3 is a perspective view of the aircraft interior cabin section showing the privacy partition in a fully opened condition.
Figure 4:
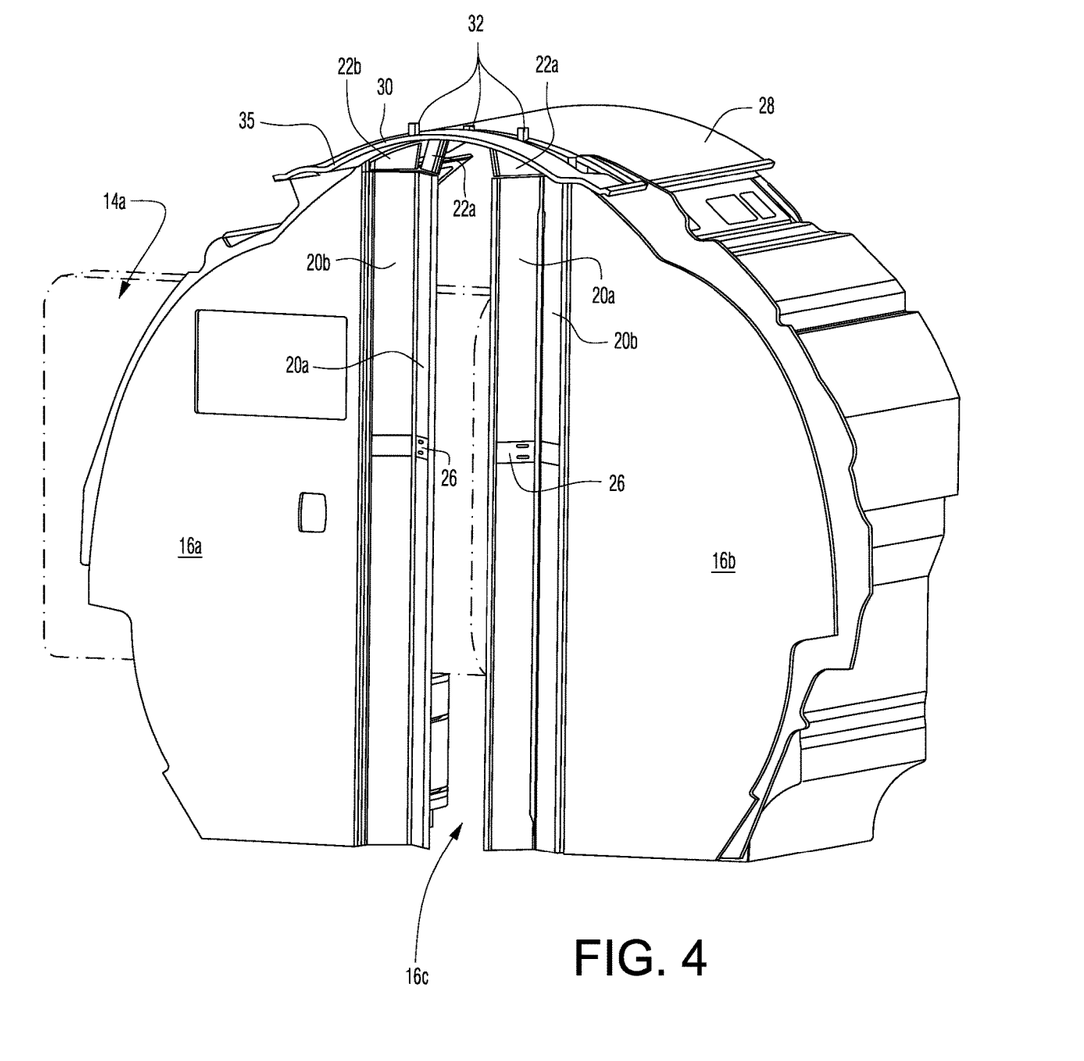
FIG. 4 is a perspective view of the aircraft interior cabin section showing the privacy partition in a partially opened condition.
Figure 5:
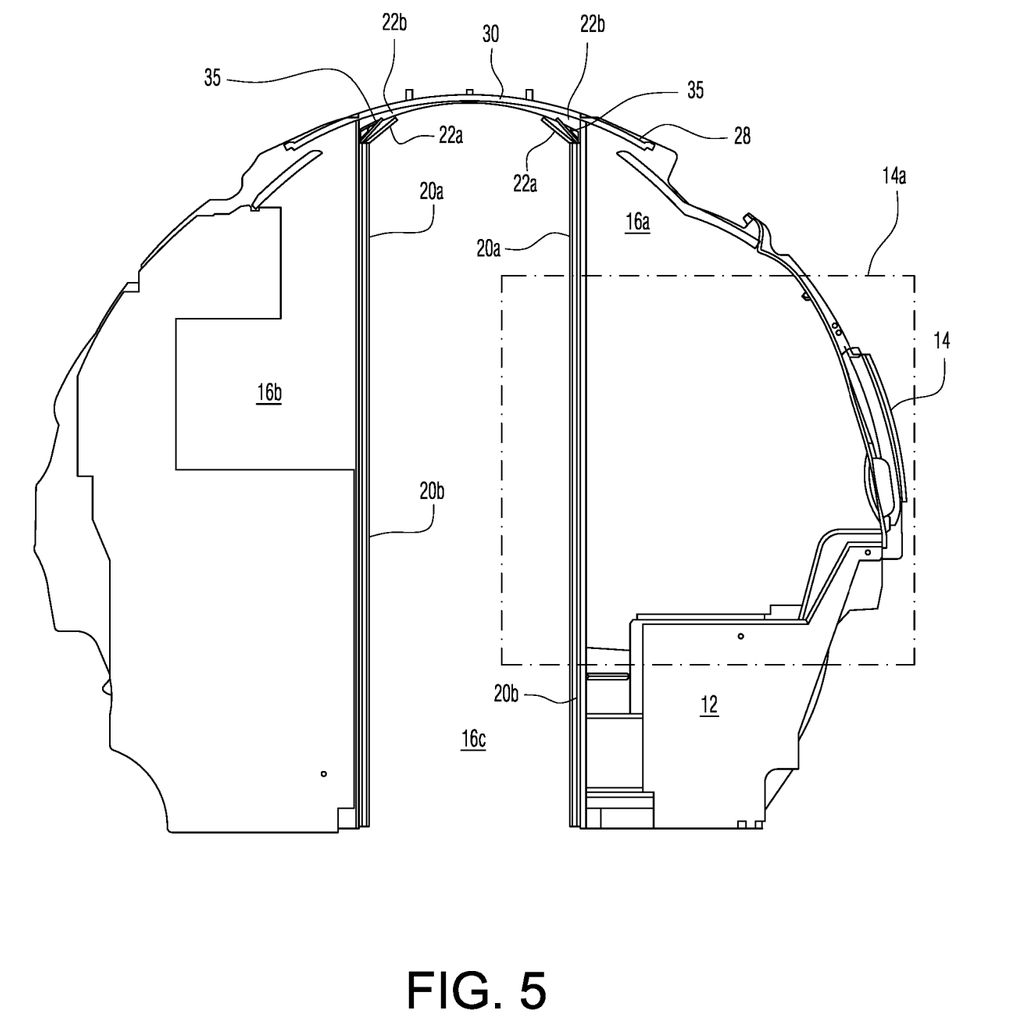
FIG. 5 is an elevational view of the aircraft interior cabin section showing the privacy partition in a fully opened condition.

The upper ends of each of the inboard main panels 20a and the outboard main panels 20b are in turn connected to inboard closeout panels 22a and outboard closeout panels 22b by respective hinge assemblies 24a, 24b. Handles 26a may be provided in each of the inboard main panels 20a. The inboard main panels 20a and the outboard main panels 20b and their associated inboard closeout panels 22a and outboard closeout panels 22b may therefore be moved manually from the closed condition depicted in FIGS. 1 and 2 to an opened condition as shown in FIGS. 3 and 5 so as to be disposed substantially flush against the interior edges of the bulkheads 16a, 16b. As depicted in FIG. 4, such movement is facilitated by the inboard main panels 20a and the outboard main panels 20b and their associated inboard closeout panels 22a and outboard closeout panels 22b, respectively, being folded against one another in a bi-fold manner. As noted previously, the handles 26 may include a conventional occupancy indicator so as to provide a visible indication whether the cabin lavatory compartment is occupied.

Figure 6:
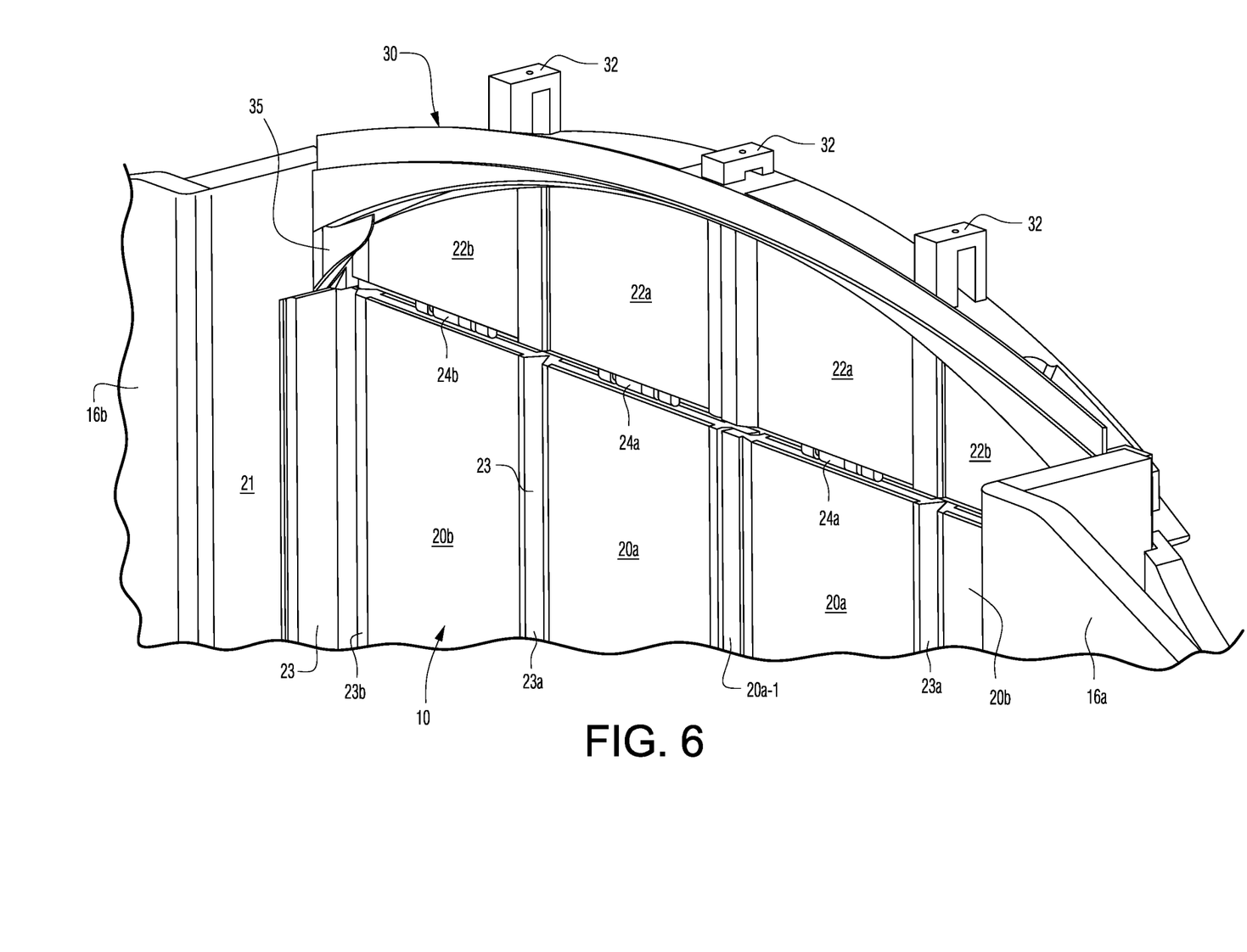
FIGS. 6 and 7 are detailed perspective and elevational views, respectively, of the upper portion of the privacy partition particularly showing the guide rail system thereof.
Figure 7:
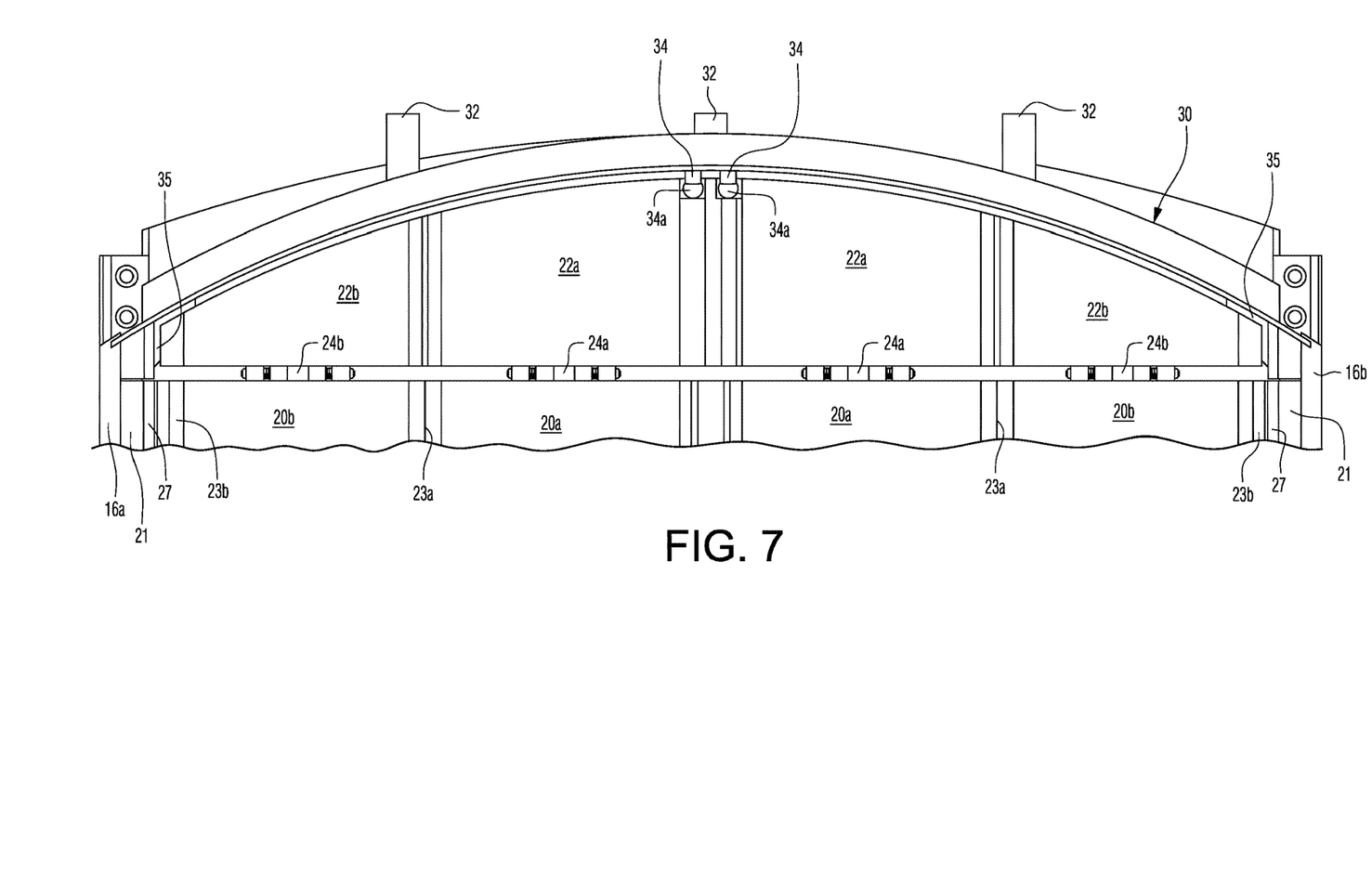

As shown in FIG. 6, the partition assembly 10 is mounted at an upper end thereof to an arcuate guide rail assembly 30 that conforms to the curvature of the headliner 28 (see FIGS. 1-5) of the interior cabin. The guide rail assembly 30 includes a number of mounting posts 32 that are connected to airframe structure (not shown) so as to dependent support the partition assembly 10 therefrom. In this regard, the inboard upper edges of the inboard closeout panels 22a are provided with guide follower members 34 possibly having magnetic attachment points 34a which separably attach the inboard closeout panels 22a (and hence the upper portion of the partition assembly 10) to the guide rail assembly 30.

The potentially magnetic attachment points 34a therefore allow the top of the partition assembly 10 to break free of the guide rail assembly 30 by a force exceeding a predetermined magnitude (e.g., a manual pushing force of an occupant exerted during an emergency egress event). During normal operation, however, the guide members 34 follow the channel defined in the guide rail assembly 30 to allow the closeout panels 22a to move between open and closed conditions. A cam member 35 is provided so as to operably engage the outboard closeout panels 22b during movement of the partition 10 into a closed condition, i.e., when the inboard main panels 20a and the outboard main panels 20b are moved into a bifold arrangement along with the inboard closeout panels 22a. It will be observed, e.g., in FIGS. 3-5 that the hinges 24a, 24b respectively allow the inboard closeout panels 22a and the outboard closeout panels 22b to be angularly positioned relative to the substantially vertically planar orientation of the inboard main panels 20a and the outboard main panels 20b, respectively, during such movement so as to maximize headroom space through the bulkhead passageway opening 16c when the partition assembly is in its fully opened condition (see FIGS. 3 and 5). The cam member 35 thus comes into contact with a respective one of the outboard closeout panels 22b to ensure that the respective outboard close out panels 22b generally angularly conform to the inboard closeout panels 22a when the partition assembly 10 is in the opened condition (see FIGS. 3 and 5).

Figure 8:
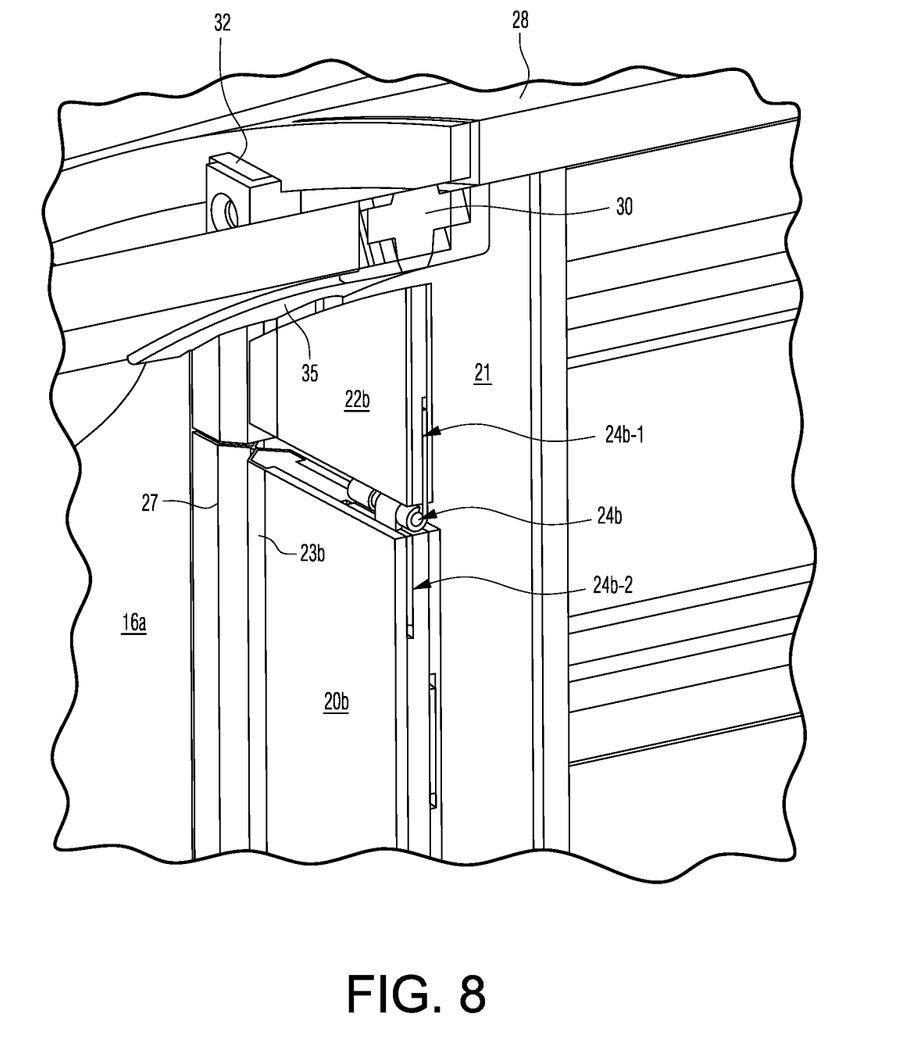
FIG. 8 is a detailed perspective view of an exemplary outboard panel of the privacy partition.

As noted briefly above, each of the hinges 24a, 24b is permanently connected between the inboard main panels 20a and the outboard main panels 20b and the inboard closeout panels 22a and the outboard closeout panels 22b, respectively. FIG. 8 shows an exemplary manner by which the hinges 24a, 24b are permanently connected with reference to the hinges 24b being mounted between the outboard main panels 20b and the respective outboard closeout panels 22b. It is to be understood that the hinges 24a may be similarly permanently connected between the inboard main panels 20a and the respective inboard closeout panels 22a. Specifically, as is shown by FIG. 8, such permanent hinged connection is provided by embedding upper and lower hinge plates 24b-1, 24b-2 within the outboard closeout panels 22b and the outboard main panels 20b.

The partition panel assembly 10 is mounted to the longitudinal inboard side edges 21 of the bulkheads 16a, 16b by any readily separable two-part mounting system to allow the longitudinal inboard side edges 21 to readily separate from the outboard main panels 20b by manual force exerted by a cabin occupant during an emergency egress event. In this regard, the longitudinal inboard side edges 21 of bulkheads 16a, 16b include one part of a two-part mounting system while opposed portions of the outboard main panels 20b include a second part of the two-part mounting system. Virtually any nonpermanent separable two-part mounting system may be employed in accordance with the present invention, such as oppositely poled magnet pairs, hook and loop fabric fasteners (e.g., Velcro-brand fasteners) and the like.

Figure 9:
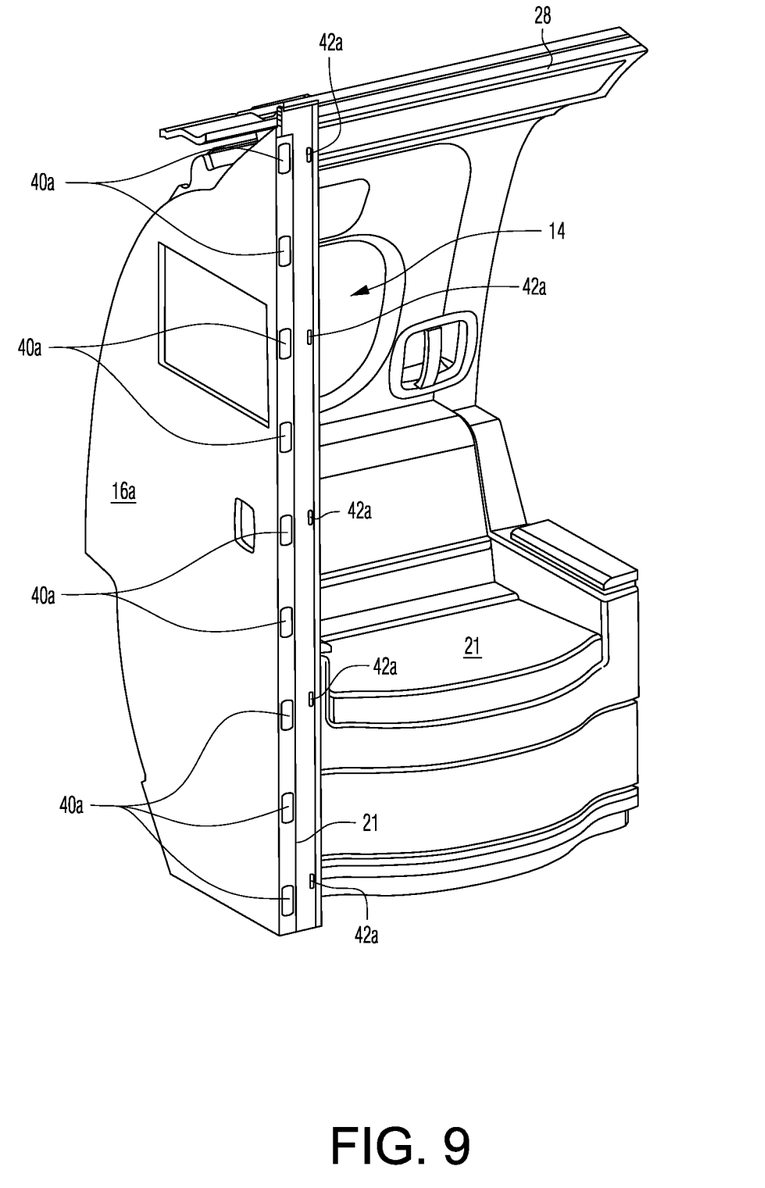
FIG. 9 is a perspective view of an exemplary bulkhead section to which the privacy partition is mounted.
Figure 10:
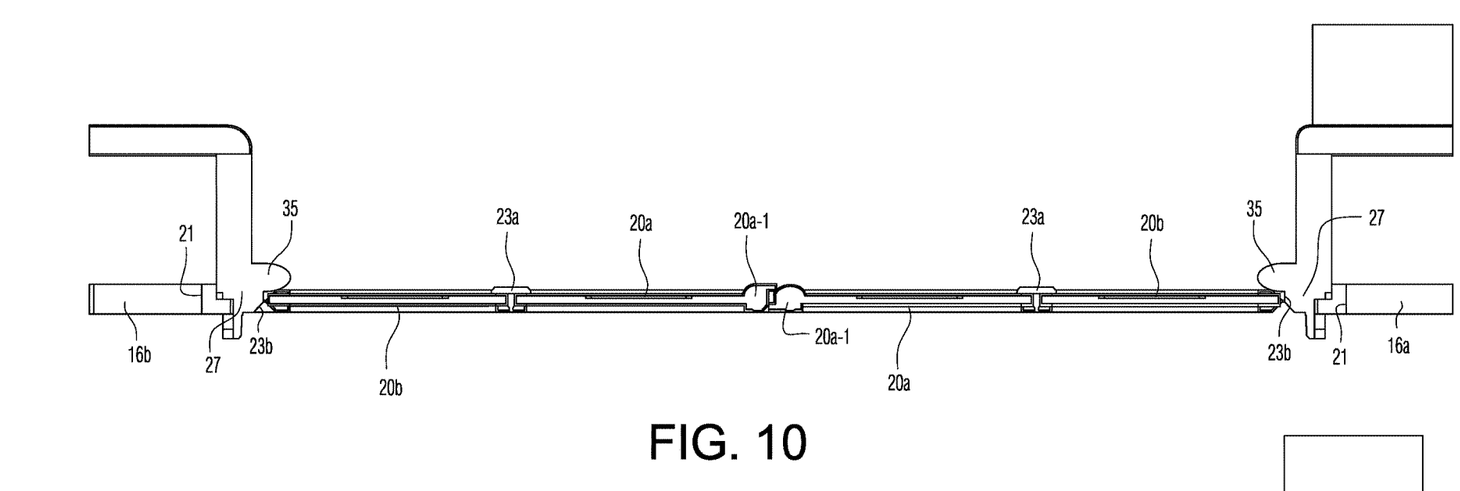
FIG. 10 is a sectional view of the privacy partition and adjacent cabin bulkheads as taken along lines 10-10 in FIG. 1.
Figure 11:
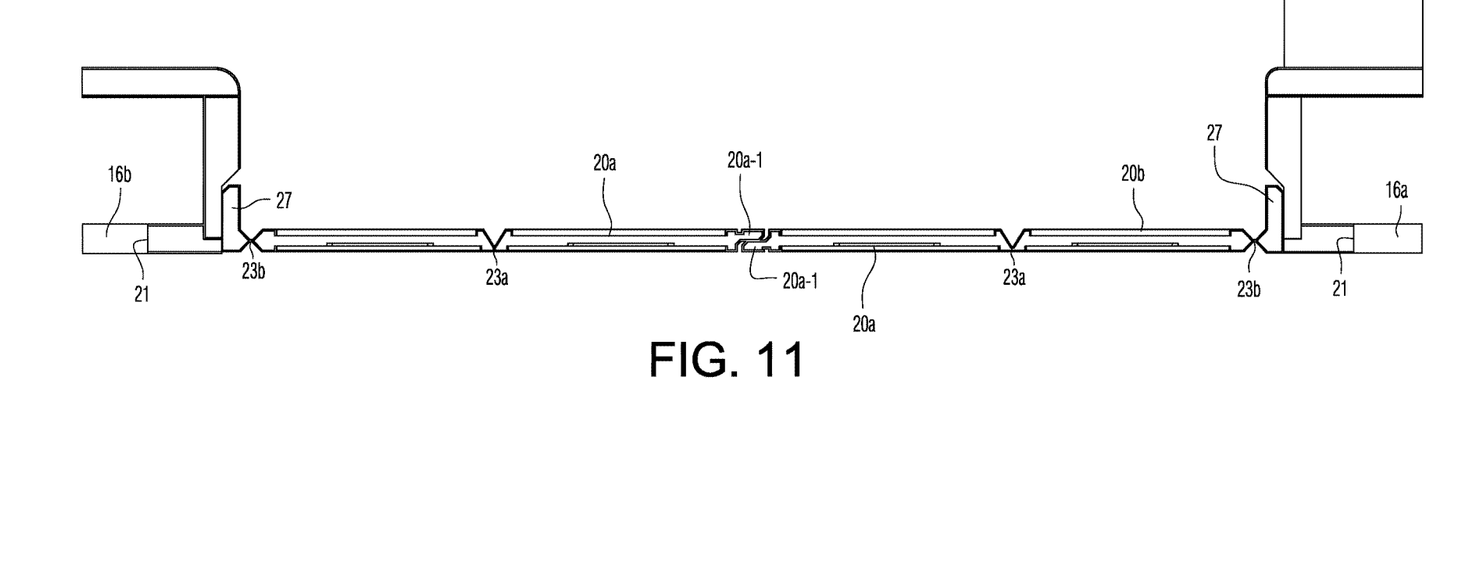
FIG. 11 is a sectional view of the privacy partition and adjacent cabin bulkheads as taken along lines 11-11 in FIG. 1.
Figure 12:
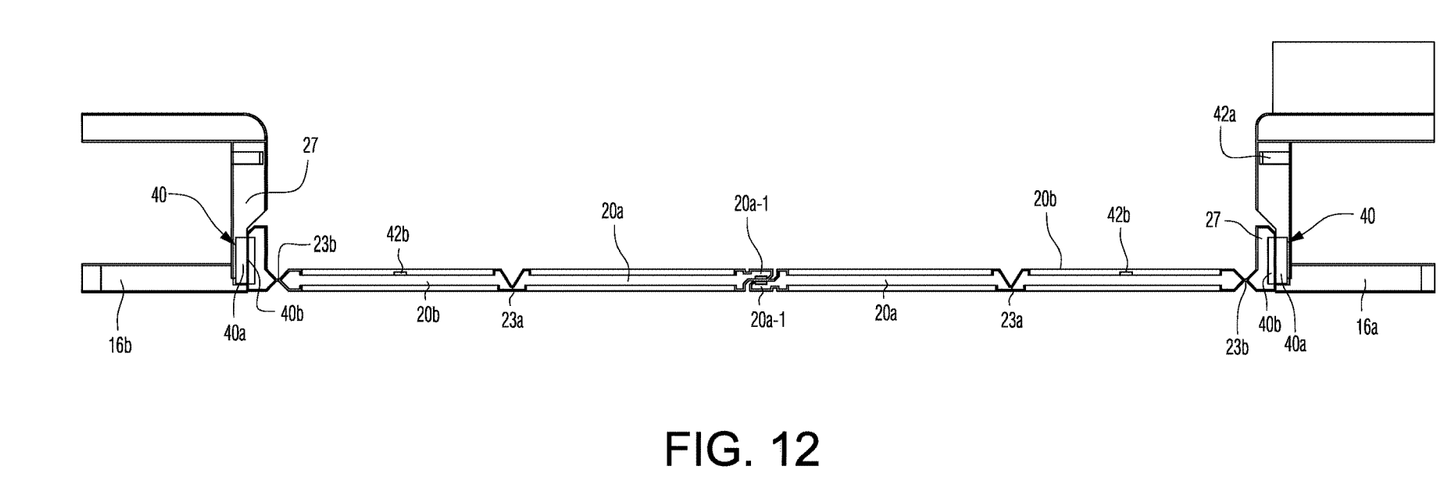
FIG. 12 is a sectional view of the privacy partition and adjacent cabin bulkheads as taken along lines 12-12 in FIG. 10.
Figure 13:
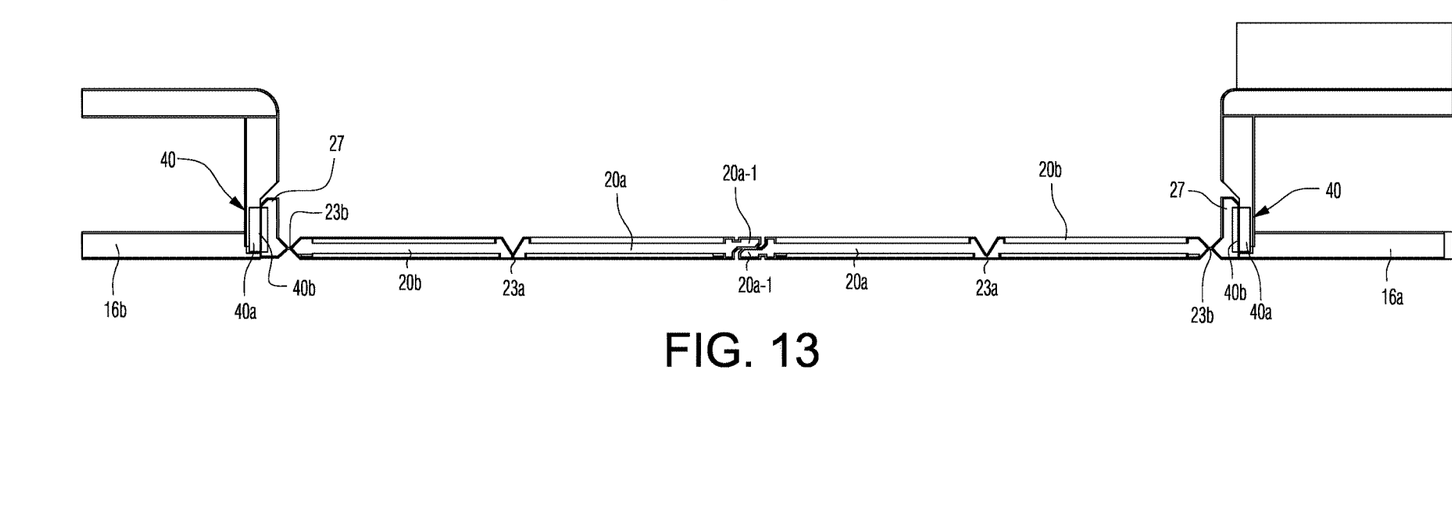
FIG. 13 is a sectional view of the privacy partition and adjacent cabin bulkheads as taken along lines 13-13 in FIG. 10.

In the embodiment depicted in the accompanying drawing Figures, sets of oppositely poled magnet pairs 40a, 40b are provided to mount the outboard main panels 20b to the longitudinal inboard side edges 21 of the bulkheads 16a, 16b. One of the mounting magnets 40a may thus be provided in the inboard edge 21 of the bulkheads 16a, 16b as representatively depicted in FIG. 9, while an oppositely poled mounting magnet 40b may be positioned in the adjacent outboard main panels 20b (see FIGS. 12 and 13).

A secondary set of oppositely poled magnet pairs 42a, 42b may also be provided in opposed relationship so as to maintain the inboard main panels 20a and the outboard main panels 20b in an opened condition. That is, one of the magnets 42a may be provided in the outboard main panels 20b while the oppositely poled magnet 42b may be provided in an adjacent region of the longitudinal inboard side edges 21. Thus, as the panels 20a, 20b move in a bifold arrangement, the magnets 42a, 42b will become magnetically coupled to one another thereby maintaining the partition assembly 10 in an opened condition.

The opposed inboard edges 20a-1 of the inboard panels 20a engage one another when the partition panel assembly 10 is in a closed condition (see FIGS. 10-13). The opposed inboard edges 20a-1 may therefore be provided with a closure coupling, e.g., opposed magnet pairs, hook and loop fabric closures and the like, so as to maintain the partition panel assembly 10 in a closed condition but allow relatively easy separation during opening.

Although not depicted in the drawing Figures, the inboard main panels 20a may be connected to the bulkheads 16a, 16b by tethers of suitable length that will positionally restrain the inboard main panels 20a and the outboard main panels 20b in the vicinity of the bulkheads 16a, 16b. Such tethers may be required to prevent the panels from becoming an airborne hazard inside the cabin during an uncontrolled decompression event.

While an aircraft cabin has been described previously in reference to the accompanying drawings, it will be understood that such a description is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:

1. A separable partition assembly comprising:
 a bulkhead structure adapted to being positioned between adjoining cabin sections of an aircraft, the bulkhead structure including opposed longitudinal inboard side edges each having an upper end and an arcuate upper edge joining each of the upper ends of the longitudinal inboard side edges to thereby define a bulkhead passageway opening through the bulkhead to allow passenger egress between the adjoining cabin sections when the bulkhead is positioned in the vehicle;
 at least one pair of substantially vertically planar outboard and inboard main panels which are sized and configured to close a lower portion of the bulkhead passageway opening defined in the bulkhead structure when the outboard and inboard main panels are in a closed condition thereof to thereby close the passageway opening defined in the bulkhead structure and thereby impede passenger egress between the adjoining cabin sections, wherein the outboard and inboard main panels have an upper end which is spaced from the arcuate upper edge of the bulkhead passageway defined in the bulkhead structure;
 a flexible connector connecting adjacent edges of the outboard and inboard main panels to one another so that the outboard and inboard main panels are foldable onto one another in a bifold manner when moved from the closed condition thereof into an open condition thereof to thereby allow passenger egress between the adjoining cabin sections through the passageway opening;
 an arcuate guide assembly spanning the upper arcuate edge of the bulkhead opening,
 at least one pair of outboard and inboard closeout panels positioned between respective top edges of the at least one pair of outboard and inboard main panels and the arcuate guide assembly, wherein each of the outboard and inboard closeout panels has a bottom edge hingedly connected to a top end of the outboard and inboard main panels, respectively, and wherein at least one of the closeout panels is slideably connected to the guide assembly to allow the outboard and inboard main panels to be guided along the arcuate guide assembly and be hingedly moved relative to the outboard and inboard main panels when moved to the open condition thereof; and
 a nonpermanent mounting system for mounting an outboard edge of the outboard main panel to an adjacent inboard side edge of the bulkhead structure to allow the outboard and inboard main panels to be moved between the open and closed conditions thereof; wherein
 the nonpermanent mounting system comprises separable mounting elements to allow the at least one main panel to be separably uncoupled from the bulkhead structure when in the closed condition thereof in response to exertion of a force of predetermined magnitude thereagainst to thereby allow unimpeded passenger egress between the adjoining cabin sections.

2. The separable partition assembly according to claim 1, which comprises first and second opposed pairs of inboard and outboard main panels joined to one another by the flexible connector.

3. The separable partition assembly according to claim 1, wherein the flexible connector is formed of a material selected from the group consisting of fabrics, natural or synthetic leathers and flexible polymeric sheet materials.

4. The separable partition assembly according to claim 1, wherein the separable mounting elements comprise two-part connection members.

5. The separable partition assembly according to claim 4, wherein the two-part connection members comprise pairs of oppositely poled magnets or hook and loop fabric fasteners.

6. The separable partition assembly as in claim 1, wherein the inboard closeout panel is slideably connected to the guide rail assembly, and the outboard closeout panel is unconnected to the guide rail assembly, and wherein the separable partition assembly further comprises a cam member operatively engageable with the outboard closeout panel to cause the outboard closeout panel to be angularly folded relative to the outboard main panel in substantial conformance to an angular folded relationship of the inboard closeout panel to the inboard main panel when in the open condition thereof.

7. The separable partition assembly as in claim 1, further comprising tether elements to tether the at least one panel to the bulkhead structure.

8. An aircraft which comprises an aircraft cabin and the separable partition assembly as in claim 1 operatively mounted within the aircraft cabin to provide privacy between adjoining cabin sections thereof.

9. The aircraft as in claim 8, wherein one adjoining cabin section comprises an emergency exit.

10. The aircraft as in claim 9, wherein the one adjoining cabin section comprises a belted toilet seat.

\* \* \* \* \*